United States Patent [19]
Ross

[11] 3,728,403
[45] Apr. 17, 1973

[54] PROCESS FOR PREPARING 2,5-DICHLORO-4-BROMOPHENOL
[75] Inventor: Frank Ross, Villa Park, Ill.
[73] Assignee: Velsicol Chemical Corporation, Chicago, Ill.
[22] Filed: Sept. 9, 1968
[21] Appl. No.: 758,621

Related U.S. Application Data

[63] Continuation-in-part of Ser. No. 511,356, Dec. 3, 1965, which is a continuation-in-part of Ser. No. 393,397, abandoned.

[52] U.S. Cl. .................................................. 260/623 H
[51] Int. Cl. ............................ C07c 39/27, C07c 39/30
[58] Field of Search .............................. 260/623 H

[56] References Cited

OTHER PUBLICATIONS

Fox et al., "Chem. Soc. Jr." (1930) pp. 1860–1861 QD 262–67
Fiesen et al., "Organic Chem.," (1944) pp. 637–638
Groggins, "Unit Process in Organic Synthesis," pp. 178–179; 229–230 and 236–237 QD 262–67

Primary Examiner—Bernard Helfin
Assistant Examiner—W. B. Lone

[57] ABSTRACT

A process for the production of 2,5-dichloro-4-bromophenol which comprises contacting 2,5-dichlorophenol with a substantially equimolar amount of bromine in the presence of a catalytic quantity of iodine.

7 Claims, No Drawings

PROCESS FOR PREPARING 2,5-DICHLORO-4-BROMOPHENOL

This application is a continuation-in-part of my copending application, Ser. No. 511,356, filed Dec. 3, 1965 which was a continuation-in-part of my copending patent application, Ser. No. 393,397, now abandoned.

This invention relates to an improved process for the production of 2,5-dichloro-4-bromophenol.

It has been previously reported in the literature that 2,5-dichloro-4-bromophenol can be prepared from 2-chloro-4-bromo-5-nitrophenyl O-nitro-p-toluenesulphonate in a multistep procedure which includes reduction, diazotization, hydrolysis, and replacement of the diazonium group with chlorine or from 2,5-dichloro-4-bromoaniline by diazotization and warming with water or steam distilling. A prior attempt to prepare 2,5-dichloro-4-bromophenol by bromination of 2,5-dichlorophenol such as by bromination in a solution of sodium acetate in glacial acetic acid is described by Fox et al. J. Chem. Soc. 1930, p. 1860. The major product obtained by Fox et al was 2,5-dichloro-4,6-dibromophenol with only a small quantity of 2,5-dichloro-4-bromophenol. Thus, heretofore, 2,5-dichloro-4-bromophenol could not be produced in substantially quantitative yield in a one-step bromination process.

Therefore, it is one object of the present invention to provide substantially pure 2,5-dichloro-4-bromophenol in substantially quantitative yield.

It is another object of this invention to provide a one-step bromination process wherein 2,5-dichloro-4-bromophenol can be produced in substantially quantitative yield from 2,5-dichlorophenol.

These and other objects and advantages of the present invention will be readily apparent from the ensuing description and examples.

The process of the present invention for the production of 2,5-dichloro-4-bromophenol in substantially quantitative yield comprises contacting 2,5-dichlorophenol with a substantially equimolar amount of bromine in the presence of a catalytic quantity of iodine. Amounts of bromine in excess of this quantity result in corresponding increases in the quantity of dibrominated material in the final product. The amount of bromine less than an equimolar amount is not critical, since such amounts merely result in correspondingly lower conversion, necessitating recovery and recycling of the unconverted 2,5-dichlorophenol.

Although this process can be performed at from about room temperature to about 250° C or higher, and in the presence or absence of solvent, it is preferably performed in the liquid phase, and most preferably in the absence of substantial quantities of solvent, in a melt of the 2,5-dichlorophenol, i.e. in liquid 2,5-dichlorophenol. This latter condition can be obtained by heating the 2,5-dichlorophenol to a temperature above its melting point and maintaining the 2,5-dichlorophenol at this temperature throughout the reaction. As a practical matter, the temperature need not be a bore about 100° C, although temperatures up to about 250° C and even higher can be used with favorable results. At increasingly higher temperatures above about 200° C, increasing amounts of undesired isomer and overbrominated materials are formed. The process can also be performed at still higher temperatures under pressure or in the vapor phase. Operating temperatures between about 30° C and 100° C are satisfactory.

The present process for the preparation of 2,5-dichloro-4-bromophenol can be effectively performed in the absence of solvent. This procedure involves melting the 2,5-dichlorophenol, adding the necessary iodine catalyst and contacting this mixture with bromine. By performing it in this manner there is no need for the use or recovery of solvent. This maximizes the use of the reactor capacity and facilitates recovery of the product.

In the alternative this process can be performed in the presence of an inert solvent. By inert solvent it is intended that the solvent not be subject to bromination so as to prevent the bromine from being used for its intended purpose. When solvents are employed, halogenated aliphatic hydrocarbons such as carbon tetrachloride, chloroform, pentachloro ethane and the like are useful. Due to its availability carbon tetrachloride is the preferred solvent. When using carbon tetrachloride a suitable procedure is to perform the reaction at the reflux temperature of the reaction system. This enables substantial completion of the reaction in a few hours. At the end of this period the solvent is removed by common procedures such as distillation.

In performing the present process iodine is used as the catalyst. The iodine should only be present in a catalytic quantity. While it is possible to use excess amounts of iodine, it is not preferred since it must be removed from the final product and since it does not materially aid the reaction. For normal purposes iodine should be present in an amount between about 0.01 and about 5 weight percent of the 2,5-dichlorophenol.

The product obtained by the process of the present invention can be used as such, or can be isolated and/or purified by common methods, such as fractional distillation, preferably in vacuo. A separation step is particularly advantageous where less than an equimolar amount of bromine is utilized to recover the unconverted 2,5-dichlorophenol for recycling.

It is unusual and unexpected that substantially quantitative yields of 2,5-dichloro-4-bromophenol are obtained by the process of the present invention since the art teaches that monobromo substitution occurs only when the 2- and 6- or 2- and 4-positions of the phenol are occupied, as described in Fox et al supra, pages 1861–1863; Kohn et al., *Monatsh.* vol. 56, 410(1930), and *Monatsh.* vol. 58, 85(1931); and Baker, et al, J. A. C. S. vol 81, 5904–7(1959); and that upon bromination of 2,5-dichlorophenol the dibromo compound is obtained in substantial quantities, as described by Fox et al, supra, page 1860 and Kohn et al, *Monatsh.* vol. 58, page 80(1931). The tribromo compound can also be obtained therefrom as described by Kohn et al, *Monatsh.* vol. 58, page 81(1931). Thus it is novel and unexpected that by the process of the present invention, 2,5-dichlorophenol, which does not have the 2- and 6- or the 2- and 4-positions occupied, is at least substantially completely monobromo-substituted in the 4-position rather than mainly dibromo-substituted in the 4- and 6-positions as would be expected from the prior art bromination processes.

The following examples are presented to illustrate the process of the present invention.

EXAMPLE 1

A solution of 2,5-dichlorophenol (16.3 g; 0.1 mol) in carbon tetrachloride (200 ml.) was placed into a 500 ml., three-necked, round-bottom flask equipped with a mechanical stirrer, dropping funnel and reflux condenser. A cooled solution of bromine (16 g.) in carbon tetrachloride (50 ml.) was added dropwise to the stirred contents of the flask from the dropping funnel. Iodine crystals (about 6) and about one inch of thin iron wire were added to the flask. The contents of the flask were heated at reflux temperature (about 77° C) for about 4 hours. After cooling, the reaction mixture was heated on a steam bath to evaporate the carbon tetrachloride solvent. The residue having a melting point of 58°–61° C and weighing 29.0 grams, was recrystallized from heptane and boiled with charcoal to yield 23.5 grams of product. This product represented a yield of 97 percent of the theoretical yield and was analyzed by gas chromatography to consist of 98 percent 2,5-dichloro-4-bromophenol and 2 percent 2,5-dichlorophenol starting material.

EXAMPLE 2

2,5-dichlorophenol (200 g.) was placed in a 250 ml. three-neck round-bottom flask equipped with a mechanical stirrer, internal thermometer, dropping funnel and reflux condenser. Iodine (1 g.) was added to the flask and the charge stirred and heated to 125° C to dissolve the iodine in the 2,5-dichlorophenol. The flask was cooled and then heated and maintained at 60°–65° C. Bromine (77 ml; 231 g) was added to the stirred contents of the flask over a period of 15 to 30 minutes. The reaction mixture was distilled in vacuo using a 6-bulb Snyder column. The major portion of the distillate was analyzed by gas chromatography and was found to have the following analysis:

| | |
|---|---|
| 2,5-dichloro-4-bromophenol | 94.8 % |
| 2,5-dichloro-6-bromophenol | 3.0 % |
| 2,5-dichlorophenol | 1.4 % |
| Unknown | 0.8 % |

EXAMPLE 3

2,5-Dichlorophenol (400 g.) was placed into a 500 ml. three-neck round-bottom flask equipped as described in Example 2. Iodine (2 g.) was dissolved into the 2,5-dichlorophenol as described in the previous example by heating to 120° C. The contents of the flask were cooled to 50° C and bromine (144 ml.) was added to the flask over a period of about 30 minutes. The reaction temperature was raised to 62° C during the addition. The reaction mixture was allowed to cool slowly over several hours. The product was analyzed by gas chromatography and found to have the following analysis:

| | |
|---|---|
| 2,5-dichloro-4-bromophenol | 94.0 % |
| 2,5-dichloro-6-bromophenol | 2.8 % |
| 2,5-dichloro-4,6-dibromophenol | 2.0 % |
| 2,5-dichlorophenol | 0.3 % |

EXAMPLE 4

2,5-Dichlorophenol (200 g.) was placed in the flask described in Example 2. Iodine (1 g.) was dissolved in the 2,5-dichlorophenol as described in the previous two examples. The contents of the flask were stirred, and heated to and maintained at 60° C. Bromine (70 ml; 210 g.) was added over a period of 9 minutes. The reaction mixture was stirred at 60° C for about 45 additional minutes. The reaction mixture was analyzed by gas chromatography and was found to have the following analysis:

| | |
|---|---|
| 2,5-dichloro-4-bromophenol | 92.6 % |
| 2,5-dichlorophenol | 2.9 % |
| Unidentified compounds | 6.8 % |

The gas chromatographic analysis indicated there was no detectable amount of 2,5-dichloro-6-bromophenol or 2,5-dichloro-4,6-dibromophenol present. However, the presence of small amounts of these materials, in the order of one percent or less, was suggested by infrared analysis.

EXAMPLE 5

2,5-Dichlorophenol (8.1 g; 0.05 mol) and bromine (8.8 g.) in carbon tetrachloride (100 ml.) were placed and stirred in a 250 ml., three-necked, round-bottom flask equipped with a mechanical stirrer, dropping funnel and reflux condenser. Iodine crystals (about 6) were added to the flask, which was left at room temperature for 136 hours. The flask was then heated on a steam bath using a jet of air passing over the surface of the reaction mixture to remove the carbon tetrachloride solvent. The residue weighed 10.8 g. (90 percent of theoretical) and was analyzed by gas chromatography to consist of 93.5 percent 2,5-dichloro-4-bromophenol and 6.5 percent 2,5-dichlorophenol.

EXAMPLE 6

2,5-Dichlorophenol (49.1 grams; 0.3 mol) and iodine (0.35 grams) were placed into a 100 ml. three-necked, round-bottom flask equipped with a mechanical stirrer, dropping funnel, reflux condenser and thermometer. The contents were maintained at a temperature between 60° and 82° C while a solution of bromine (48 grams; 0.3 mol) was added dropwise from the dropping funnel with vigorous stirring of the reaction mixture. The addition time was approximately three hours. The reaction mixture was stirred for an additional hour while being maintained within the stated temperature range. At the end of that time the reaction mixture was cooled to room temperature. A sample of the reaction mixture was analyzed by gas chromatography as follows:

| | |
|---|---|
| 2,5-dichloro-4-bromophenol | 96.2 % |
| 2,5-dichloro-6-bromophenol | 0 % |
| 2,5-dichloro-4,6-dibromophenol | 1.8 % |
| 2,5-dichlorophenol | 1.8 % |

The following examples highlight the unobviousness of the present process. Example 7 is substantially identical with Example 6 except that the iodine was not used. Example 8 is substantially identical with Example 6 except that iron was used rather than the iodine catalyst of Example 6. Example 9 is a substantial duplication of the experiment set forth in the previously cited Fox et al reference. It can be seen from the results of these examples that the present process results in the desired product in yields not obtainable without the use of catalyst, other known halogenation catalysts or procedure of the Fox et al publication.

EXAMPLE 7

2,5-Dichlorophenol (49.1 gram; 0.3 mol) was placed into a 100 ml, three-necked, round-bottom flask equipped with a mechanical stirrer, dropping funnel, reflux condenser and thermometer. The contents were maintained at a temperature between 60° and 82° C. while a solution of bromine (48 grams; 0.3 mol) was added dropwise from the dropping funnel with vigorous stirring of the reaction mixture. The addition time was approximately 3 hours. The reaction mixture was stirred for an additional hour while being maintained within the stated temperature range. At the end of that time the reaction mixture was cooled to room temperature. A sample of the reaction mixture was analyzed by gas chromatography as follows:

| | |
|---|---|
| 2,5-dichloro-4-bromophenol | 75.0 % |
| 2,5-dichloro-6-bromophenol | 19.7 % |
| 2,5-dichloro-4,6-dibromophenol | 2.2 % |
| 2,5-dichlorophenol | 92.7 % |

EXAMPLE 8

2,5-Dichlorophenol (49.5 grams; 0.3 mol) and powdered iron (0.48 grams) were placed into a 100 ml, three-necked round-bottom, flask equipped with a mechanical stirrer, dropping funnel, reflux condenser and thermometer. The contents were maintained at a temperature between 60° and 82° C while a solution of bromine (48 grams; 0.3 mol) was added dropwise from the dropping funnel with vigorous stirring of the reaction mixture. The addition time was approximately 3 hours. The reaction mixture was stirred for an additional hour while being maintained within the stated temperature range. At the end of that time the reaction mixture was cooled to room temperature. A sample of the reaction mixture was analyzed by gas chromatography as follows:

| | |
|---|---|
| 2,5-dichloro-4-bromophenol | 51.8 % |
| 2,5-dichloro-6-bromophenol | 15.7 % |
| 2,5-dichloro-4,6-dibromophenol | 20.5 % |
| 2,5-dichlorophenol | 12.0 % |

EXAMPLE 9

2,5-Dichlorophenol (4.08 grams; 0.025 mol) and glacial acetic acid (20 ml) containing anhydrous sodium acetate (2.05 gram) were placed in a glass reaction flask. A solution of bromine (4.0 grams; 0.025 mol) in glacial acetic acid (5 ml) was added to the reaction mixture at room temperature. The mixture was warmed by use of a boiling water bath, filtered and analyzed by gas chromatography as follows:

| | |
|---|---|
| 2,5-dichloro-4-bromophenol | 29 % |
| 2,5-dichloro-6-bromophenol | 20 % |
| 2,5-dichloro-4,6-dibromophenol | 31 % |
| 2,5-dichlorophenol | 20 % |

I claim:

1. A process for the production of 2,5-dichloro-4-bromophenol which comprises contacting 2,5-dichlorophenol with a substantially equimolar amount of bromine in the presence of a catalytic quantity of iodine at a temperature from about room temperature to about 200°C.

2. The process of claim 1 wherein the 2,5-dichlorophenol is contacted with bromine at a temperature of from about the melting point of the 2,5-dichlorophenol to about 200° C.

3. The process of claim 1 wherein the iodine catalyst is present in an amount between about 0.01 and about 5 weight percent of the 2,5-dichlorophenol.

4. The process of claim 2 wherein the temperature is between about 30° C and about 100° C.

5. The process of claim 1 wherein the reaction is performed in the liquid phase in the absence of solvent.

6. The process of claim 1 wherein the reaction is performed in a solvent selected from the group consisting of halogenated aliphatic hydrocarbons and carbon disulfide.

7. The process of claim 5 wherein the solvent is carbon tetrachloride.

* * * * *